(12) United States Patent
Wu et al.

(10) Patent No.: US 12,364,983 B2
(45) Date of Patent: Jul. 22, 2025

(54) FLUID FLOW CHANNEL CONTROL SYSTEM

(71) Applicant: INDUSTRIAL TECHNOLOGY RESEARCH INSTITUTE, Hsinchu (TW)

(72) Inventors: Li-An Wu, New Taipei (TW); Nien-Jen Chou, Hsinchu (TW); Chih-Wen Yang, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 40 days.

(21) Appl. No.: 18/391,768

(22) Filed: Dec. 21, 2023

(65) Prior Publication Data

US 2025/0196136 A1    Jun. 19, 2025

(30) Foreign Application Priority Data

Dec. 19, 2023   (TW) .................................. 112149589

(51) Int. Cl.
*B01L 1/00* (2006.01)
*B01L 3/00* (2006.01)
*F16K 99/00* (2006.01)

(52) U.S. Cl.
CPC ..... *B01L 3/502753* (2013.01); *B01L 3/50273* (2013.01); *B01L 2200/04* (2013.01);
(Continued)

(58) Field of Classification Search
CPC .......... F16K 99/0001; B01L 3/502753; B01L 3/50273; B01L 2200/04; B01L 2300/0832; B01L 2400/0622
See application file for complete search history.

(56) References Cited

U.S. PATENT DOCUMENTS 4,891,125 A  *  1/1990  Schultz ................ G01N 27/301
                                                      264/267
11,389,637 B2    7/2022  Cheng et al.
(Continued)

FOREIGN PATENT DOCUMENTS

CN    212480133 U    2/2021
CN    116044771 A    5/2023
(Continued)

OTHER PUBLICATIONS

Taiwan Patent Office, "Office Action", Jul. 16, 2024, Taiwan.

*Primary Examiner* — P. Macade Nichols
(74) *Attorney, Agent, or Firm* — Troutman Pepper Locke LLP; Tim Tingkang Xia, Esq.

(57) ABSTRACT

A fluid flow channel control system includes a centrifugal cassette, valve plugs, a bolt, a drive module and a control unit. The centrifugal cassette includes a cassette body, valve seats, upper, lower and communicating flow channels. The valve seats are provided on the surface of the cassette body, the valve seats, the communicating, the upper and lower flow channels are provided on the different positions inside the cassette body, and form a flow channel. Each of the valve plugs is movably accommodated on the corresponding valve seats, and includes a plug-and-unplug hole and a flange. The bolt driving element is in signal connection with the bolt. The control unit is in signal connection with the drive module, and controls the bolt driving element to drive the bolt to move, allowing the flange to be moved between a first position and a second position to close or open the flow channel.

17 Claims, 11 Drawing Sheets

(52) U.S. Cl.
CPC .............. *B01L 2300/0832* (2013.01); *B01L 2400/0622* (2013.01); *F16K 99/0001* (2013.01)

(56) References Cited

U.S. PATENT DOCUMENTS

2006/0216812 A1* 9/2006 Okada ............... B01L 3/502715
　　　　　　　　　　　　　　　　　　　　　　435/288.5
2020/0397418 A1* 12/2020 Williams ............ B01L 3/50825

FOREIGN PATENT DOCUMENTS

| TW | 201344193 A | 11/2013 |
| TW | 202329280 A | 7/2023 |

* cited by examiner

FLUID FLOW CHANNEL CONTROL SYSTEM

CROSS REFERENCE TO RELATED APPLICATION

All related applications are incorporated by reference. The present application is based on, and claims priority from, Taiwan Application Serial Number 112149589, filed on Dec. 19, 2023, the disclosure of which is hereby incorporated by reference herein in its entirety.

TECHNICAL FIELD

The present disclosure relates to a fluid flow channel control system.

BACKGROUND

In response to the development of the environment and trends, point-of-care testing (POCT) have also emerged as a testing model. POCT usually refers to related testing activities performed by nearby subjects. It does not need to go to a large hospital for testing. It can detect quickly and effectively, and can detect factors that endanger health in time to increase the chance of cure or prevent the occurrence of disease.

With the epidemic of global diseases in recent years, more and more attention has been paid to POCT. In order to monitor these tiny molecules in real time, many manufacturers will develop microfluidic chips for sample detection. In addition to being small and easy to carry, this technology. In addition to being small and portable, this technology must also be easy to use. Therefore, the chip will need to carry out a variety of automated liquid manipulations, such as the mixing of multiple liquids, centrifugal separation, liquid transmission, etc., making the operation easier and more user-friendly, etc., to lower the user threshold. Driving the flow of liquid in a microfluidic chip can control the liquid through gas pressure, capillary action, centrifugal force or hydrophobicity. However, the diversity and complexity of the sample will cause different hydrophilic and hydrophobic effects, which will also cause the liquid to be difficult to be accurately controlled in the chip.

On the other hand, when facing some highly complex samples, most of the impurities will need to be removed through high-speed centrifugation. At this time, the centrifuge cassette selected needs to have good liquid barrier capabilities to avoid precious samples being lost during centrifugation. Therefore, the valve plays an important role in the fluidic chip. It not only needs to have effective blocking capabilities, but also needs to have simple control requirements to reduce the complexity of the detection equipment to achieve the purpose of effectively controlling the fluid.

SUMMARY

The present disclosure provides a fluid flow channel control system, capable of effectively controlling the flow direction of the fluid, so as to achieve the purpose of detection.

The present disclosure proposes a fluid flow channel control system, including: a centrifugal cassette, including a cassette body, at least one valve seat, at least one upper flow channel, at least one lower flow channel, and at least one communicating flow channel, where the at least one valve seat is provided on the surface of the cassette body, the at least one upper flow channel and the corresponding at least one lower flow channel are provided on different positions inside the cassette body, and communicated with each other through the corresponding at least one communicating cannel, allowing the at least one lower flow channel, at least one communicating flow channel and the at least one upper flow channel to be formed into a flow channel, and the at least one valve seat is provided on the at least one communicating flow channel; at least one valve plug, movably accommodated on the at least one valve seat corresponding thereto, and including a plug-and-unplug hole and a flange; a bolt, including a bolt head; a drive module, including a bolt driving element in signal connection with the bolt; and a control unit, in signal connection with the drive module, and controlling the bolt driving element to drive the bolt, allowing the flange to be moved between a first position and second position to close or open the flow channel while the bolt head is inserted in the plug-and-unplug hole.

Based on the above, the fluid flow channel control system of the present disclosure controls the flow direction of the fluid effectively through the matching structure of the bolt and valve plug, and cooperates with centrifugal rotation to achieve the purpose of detection.

DETAILED DESCRIPTION

The following embodiments are enumerated and described in detail with reference to the accompanying drawings, but the provided embodiments are not intended to limit the scope of the present disclosure. In addition, the drawings are for illustrative purposes only and are not drawn to original size. To facilitate understanding, the same elements will be identified with the same symbols in the following description.

The terms "including", "comprising", "having", etc. mentioned in this disclosure are all open terms, that is, they mean "comprising but not limited to".

In the description of various embodiments, when terms such as "first", "second", "third", "fourth", etc. are used to describe elements, they are only used to distinguish these elements from each other, and There is no restriction on the order or importance of these elements.

In the description of various embodiments, the so-called "coupling" or "connection" may refer to two or more elements directly making physical or electrical contact with each other, or indirectly making physical or electrical contact with each other. "Coupling" or "connection" can also refer to the mutual operation or action of two or more components.

Figure 1:
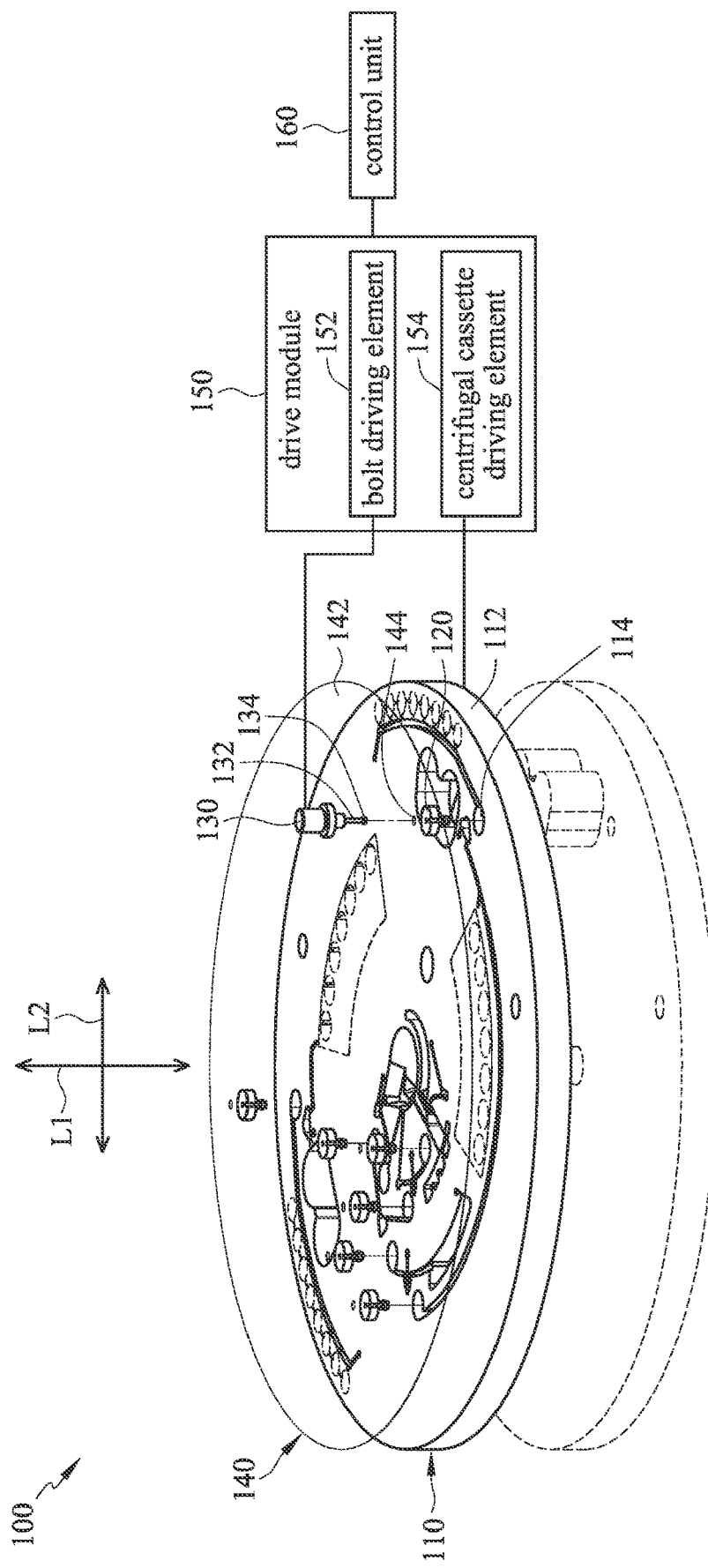
FIG. 1 is a system architecture diagram of an embodiment of a fluid flow channel control system of the present disclosure.
Figure 2:
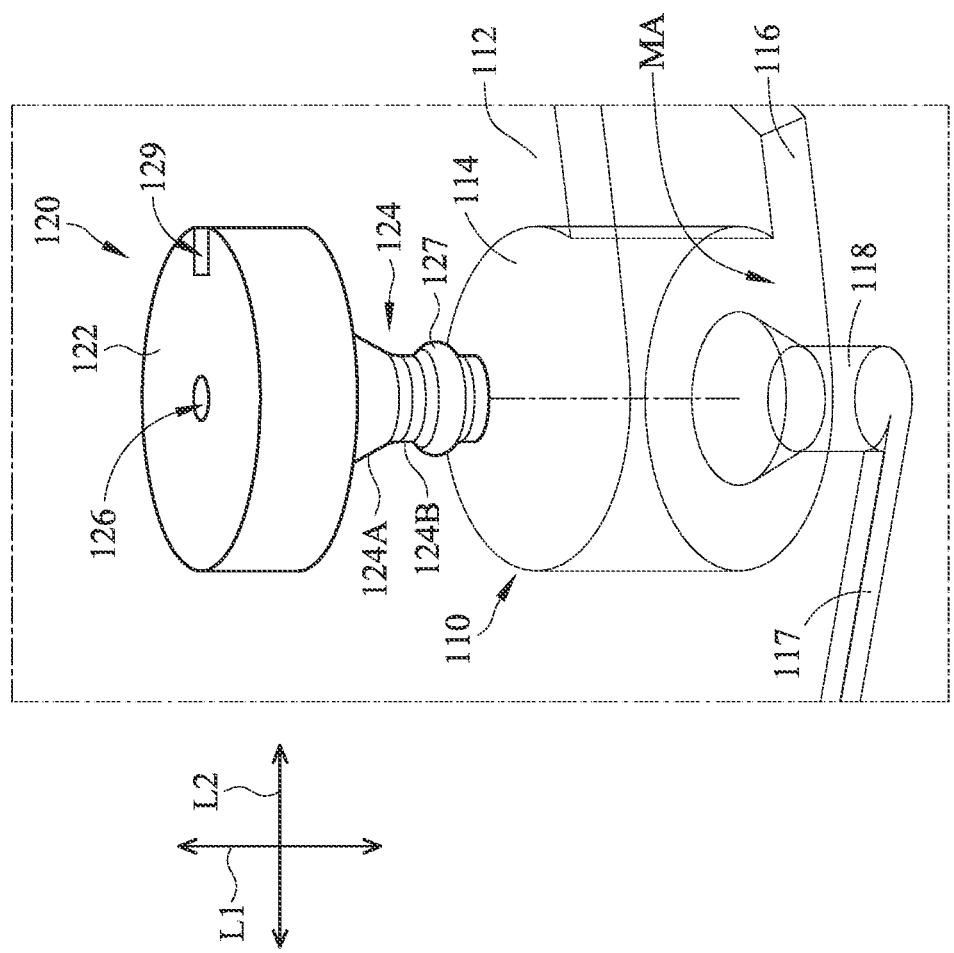
FIG. 2 is a separation view of an embodiment of a flow channel and valve plug of the present disclosure.

FIG. 1 is a system architecture diagram of an embodiment of a fluid flow channel control system of the present disclosure, where dotted lines are used to represent the elements that can be configured according to actual situation. FIG. 2 is a schematic view of a separation schematic view of an embodiment of a fluid flow channel and valve plug of the present disclosure. Referring to FIGS. 1 and 2, a fluid flow channel control system 100 includes a centrifugal cassette 110, valve plug 120, bolt 130, thin film 140, drive module 150, and control unit 160, where the control unit 160 may be realized through hardware (such as integrated circuit or CPU), software (such as program instructions executed by a processor) or the combination thereof, and in signal connection with the drive module 150; the control unit 160 may provide program instructions to the drive module 150 for the execution of related actions according to process requirements; and the drive module 150 may be provided with related elements according to actual situation, including a bolt driving element 152, and centrifugal cassette driving element 154, where the bolt driving element 152 is in signal connection with the bolt 130 to drive it to move, for example, to move or rotate it in a space constituted by an axil direction L1 and radial direction L2 of a cassette body 112, where the axial direction L1 is vertical movement, and the radial direction L2 is horizontal movement. Furthermore, the centrifugal cassette driving element 154 is in signal connection with the centrifugal cassette 110, thereby driving the centrifugal cassette 110 to rotate centrifugally.

Taking FIG. 2 as an example, showing the valve plug 120, and partial centrifugal cassette 110; the centrifugal 110 includes the cassette body 112, a valve seat 114, a upper flow channel 116, a lower flow channel 117, and a connecting flow channel 118. The numbers of valve seat 114, upper flow channel 116, lower flow channel 117, and connecting flow channel 1118 may be determined according to the actual situation, and the valve seat 114 is provided on the surface of the cassette body 112, allowing an accommodating space to be formed inside the cassette body 112 for the configuration of the valve plug 120. The upper flow channel 116 and lower flow channel 117 are respectively provide on a different position inside the cassette body 112; the upper flow channel 116 and lower flow channel 117 are, for example, two grooves provided along the radial direction L2 of the cassette body 112; and along the axial direction L1 of the cassette body 112, the upper flow channel 116 and the lower flow channel 117 have an upper and lower positional relationship, for example. Furthermore, the connecting flow channel 118 is a groove provided the axial direction L1 of the cassette body 112, and sizes of the upper flow channel 116, lower flow channel 117, and connecting flow channel 118 are adjusted according to the actual situation.

In the embodiment, the upper flow channel 116 and lower flow channel 117 are in communication with each other through the connecting flow channel 118 along the axial direction L1 of the cassette body 112, allowing the lower flow channel 117, connecting flow channel 118 and upper flow channel 116 to be formed into a flow channel MA flowing from the lower flow channel 117 to the upper flow channel 116.

Figure 3:
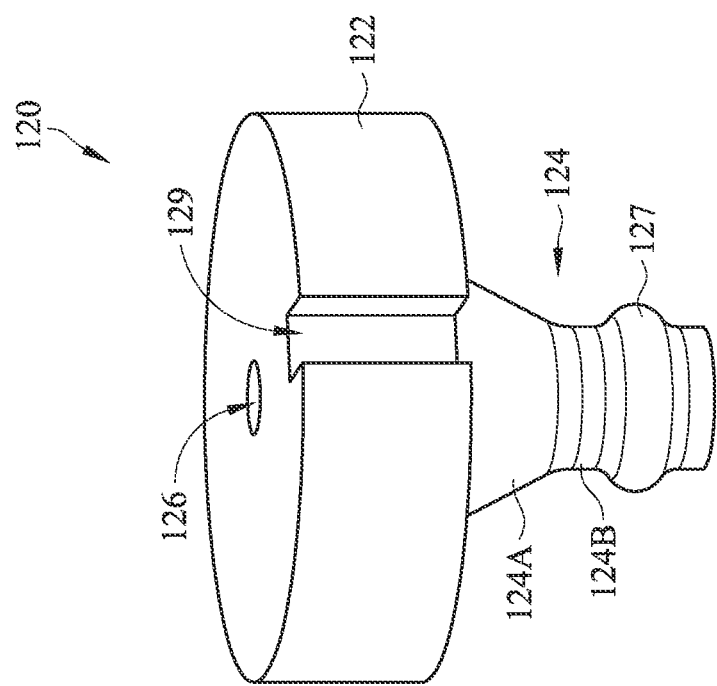
FIG. 3 is a schematic view of the valve plug of the present disclosure.
Figure 4:
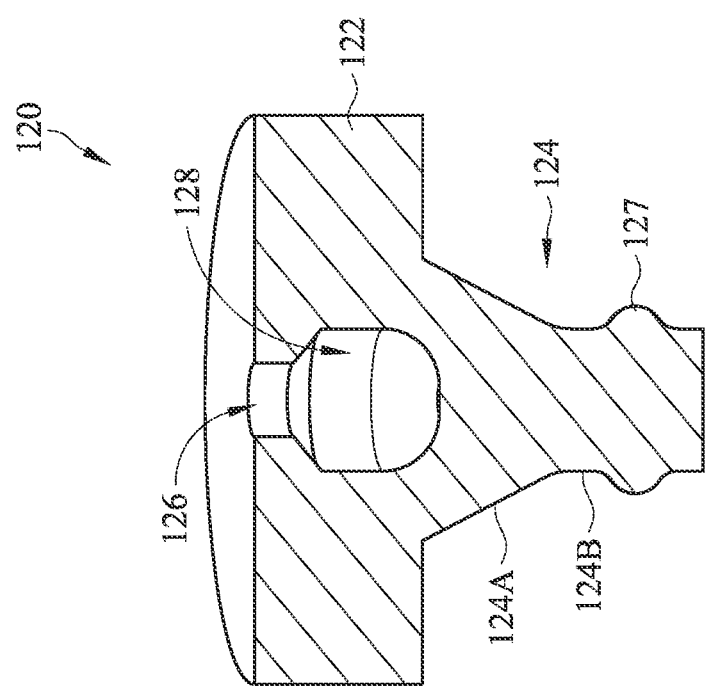
FIG. 4 is a cross-sectional view of the valve plug of the present disclosure.

FIG. 3 is a schematic view of the valve plug of the present disclosure. FIG. 4 is a cross-sectional view of the valve plug of the present disclosure. Referring to FIGS. 1 to 4, the valve plug 120 of the present disclosure may be movably accommodated on the valve seat 114 along the axial direction L1, the valve plug 120 is made of a soft material, and the valve plug 120 is softer than the bolt 130. Furthermore, the valve plug 120 includes a upper valve body 122, lower valve body 124, plug-and-unplug hole 126, flange 127, accommodating groove 128, and cutting groove 129, where the upper valve body 122 is connected to the lower valve body 124, and the upper valve body 122 is wider than the lower valve body 124. The plug-and-unplug hole 126 is penetrated inside the upper valve body 122 but is not a through hole, the accommodating groove 128 is provided inside the upper valve body 122 and in communication with the plug-and-unplug hole 126, and the accommodating groove 128 is larger than the plug-and-unplug hole 126 in diameter, forming a type of an inner space being larger than the plug-and-unplug hole 126. the cutting groove 129 is differently positioned from the plug-and-unplug hole 126. Furthermore, the cutting groove 129 is provided on the outer peripheral side of the upper valve body 122 and is a through slot.

The flange 127 is protruded out from the outer surface of the lower valve body 124. Specially, the lower valve body 124 includes a connecting section 124A and a plunger section 124B, where the connecting section 124A is connected between the upper valve body 122 and plunger section 124B, and the flange 127 is provided on a section of the plunger section 124B and away from the upper valve body 122. The flange 127 is a convex structure of the outer peripheral side of the plunger section 124B, and the flange 127 is larger than the plunger section 124B in diameter.

Figure 5:
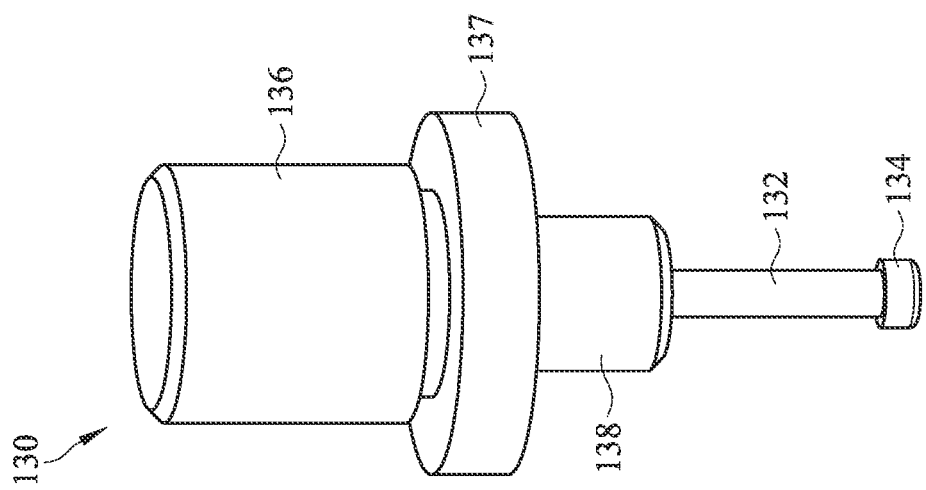
FIG. 5 is a schematic view of the bolt of the present disclosure.

FIG. 3 is a schematic view of the bolt of the present disclosure. Referring to FIGS. 1 and 5, the bolt 130 includes a rod body 132, bolt head 134, head part 136, central part 137, and connecting part 138, where the bolt head 134 is connected to the bottom of the rod body 132, and the size of the rod body 132 is smaller than the diameter size of the bolt head 134, allowing the bottom of the bolt to have a convex structure protruded out form the rod part 132. The central part 137 is connected between the head part 136 and connecting part 138, the connecting part 138 is connected to the rod body 132, the size of the rod body 132 is smaller than the diameter size of the connecting part 138, and the connecting part 138 is larger than the bolt head 134 in size. Furthermore, the bolt 130 is, for example, an electromagnetic or pneumatic or hydraulic cylinder, and the rod body 132 is a connecting rod.

Figure 6:
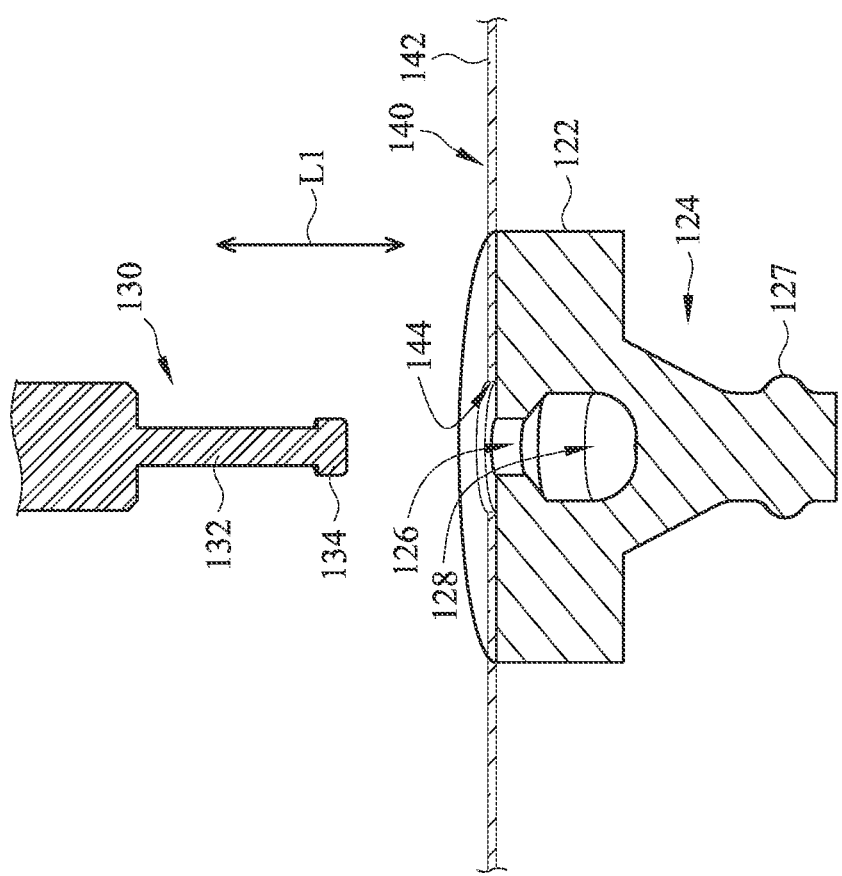
FIG. 6 is a partial cross-sectional view of the relative positions of the valve plug, the bolt and a thin film of the present disclosure.
Figure 7:
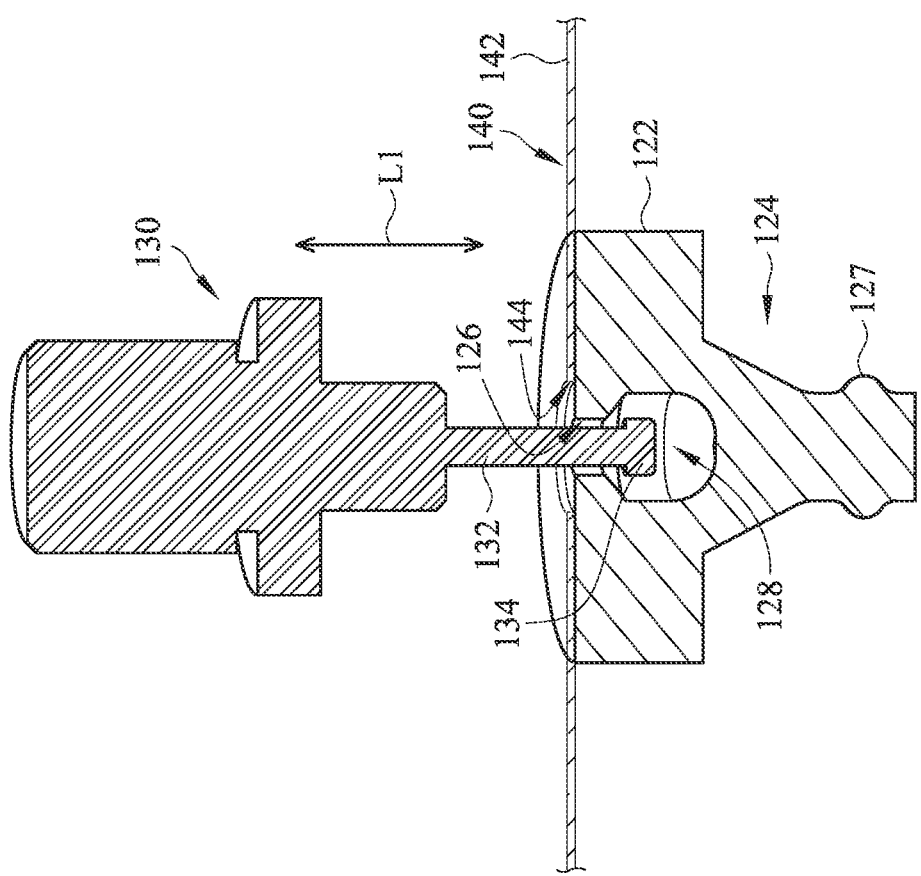
FIG. 7 is a partial cross-sectional view of the bolt inserted in the valve plug according to the present disclosure.

FIG. 6 is a partial cross-sectional schematic view of the relative positions of the valve plug, bolt and thin film of the present disclosure. FIG. 7 is a partial cross-sectional view of the bolt inserted in the valve plug of the present disclosure. Referring to FIGS. 1, 6 and 7, the thin film 140 of the present disclosure includes a thin film body 142, and a plurality of thin film holes 144, where the shape of the thin film body 142 may approximately match the shape of the cassette body 112, and is covered on the cassette body 112. The thin film hole 144 are passed through the thin film body 142, and is, for example, a circular hole or a hole of any shape, and the position of the thin film hole 144 corresponds to the position of the valve seat 114. Furthermore, the thin film hole 144 is smaller than the valve plug 120 in diameter size, and larger than the bolt head 134 in diameter size, so that the bolt head 134 can be passed through the thin film hole 144, and the bolt 130 can be extracted from the thin film 140, but the valve plug 120 cannot be extracted from the thin film 140.

In addition, the bolt head 134 is larger than the plug-and-unplug hole 126 in diameter size, but the bolt head 134 can be inserted inside the plug-and-unplug hole 126 since the valve plug 120 is softer than the bolt 130, as FIG. 7 shows. Furthermore, the plug-and-unplug hole 126 can be contracted to the original size again due to the softness of the valve plug 120, allowing the bolt head 134 to be stably inserted inside the plug-and-unplug hole 126, so that the bolt 130 can be used to change the position of the valve plug 120.

Furthermore, the bolt head 134 can be inserted in the accommodating groove 128, the width of which is larger than the diameter of the bolt head 134, so that the accommodating groove 128 and bolt head 134 are not tightly attached to each other, which can make it easier to move the valve plug 120 up and down.

Figure 8:
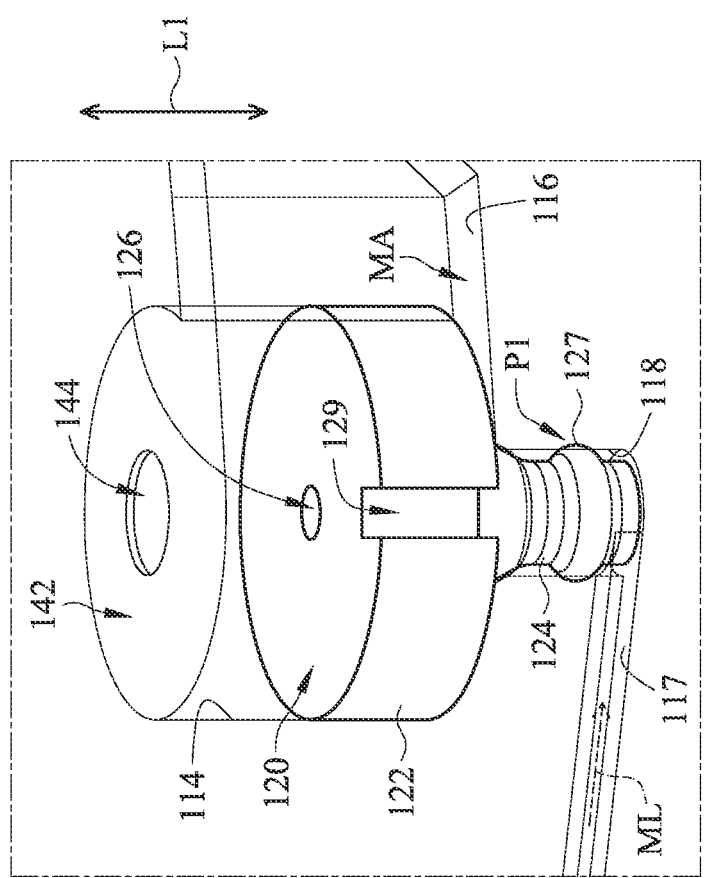
FIG. 8 is a schematic view of the valve plug of the present disclosure in a first position from an angle of view.

FIG. 8 is a schematic view of the valve plug of the present disclosure in a first position from one angle of view. Referring to FIG. 8, when the flange 127 in the valve plug 120 of the present disclosure is in a first position P1, the first position P1 is that the flange 127 is located in the communicating flow channel 118 to stop the fluid ML flow in the lower flow channel 117, making the fluid ML not able to flow from the lower flow channel 117 to the upper flow channel 116, so as to stop the fluid ML flow in the flow channel MA. It can be known from this that the present disclosure can move the valve plug 120 to open or close the flow channel MA, thereby achieving the purpose of controlling the flow direction of the flow.

Furthermore, the upper valve body 122 can be movably accommodated on the valve seat 114 along the axial direction L1, and the groove opening structure of the cutting groove 129 is used to make the upper valve body 122 and valve seat 114 not a closed structure, so that the valve plug 120 can be moved more smoothly.

In addition, since the size of the flange 127 roughly matches the size of the communicating flow channel 118, the size of the lower valve body 124 is smaller than the size of the communicating flow channel 118 to facilitate up and down movement.

Figure 10:
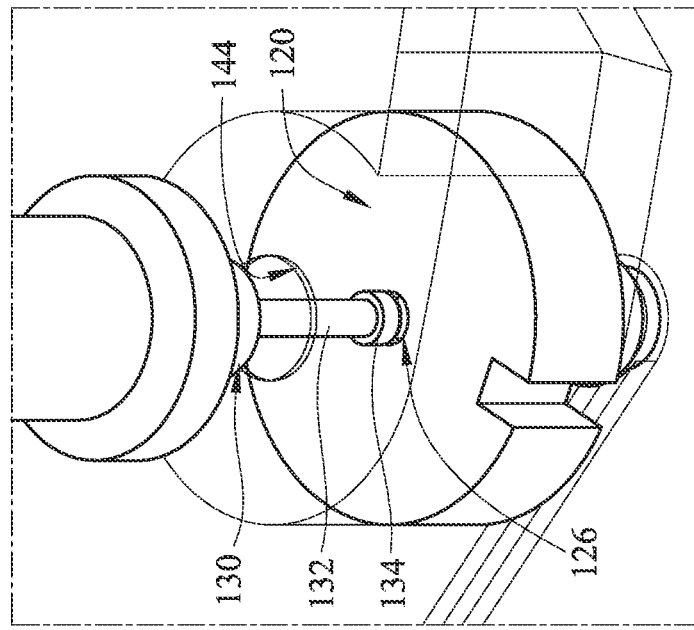
FIG. 10 is an action schematic view of the bolt and valve plug in the first position according to the present disclosure.
Figure 9:
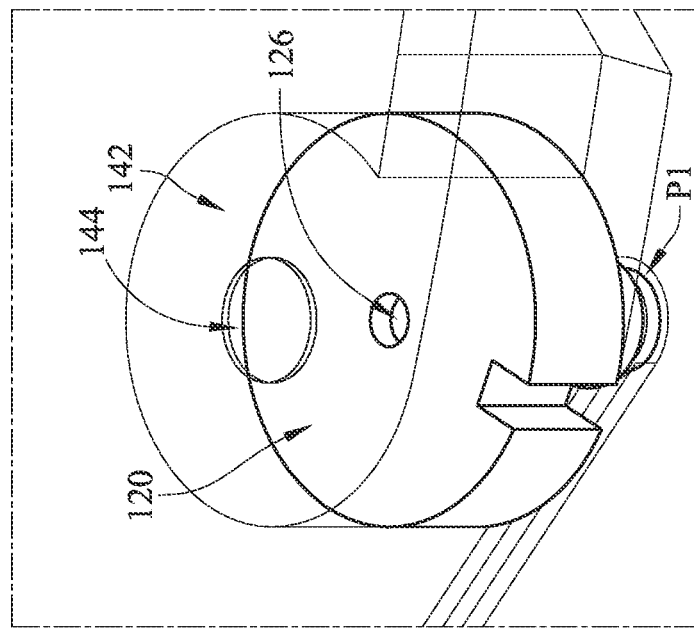
FIG. 9 is a schematic view of the valve plug of the present disclosure in the first position from another angle of view.
Figure 11:
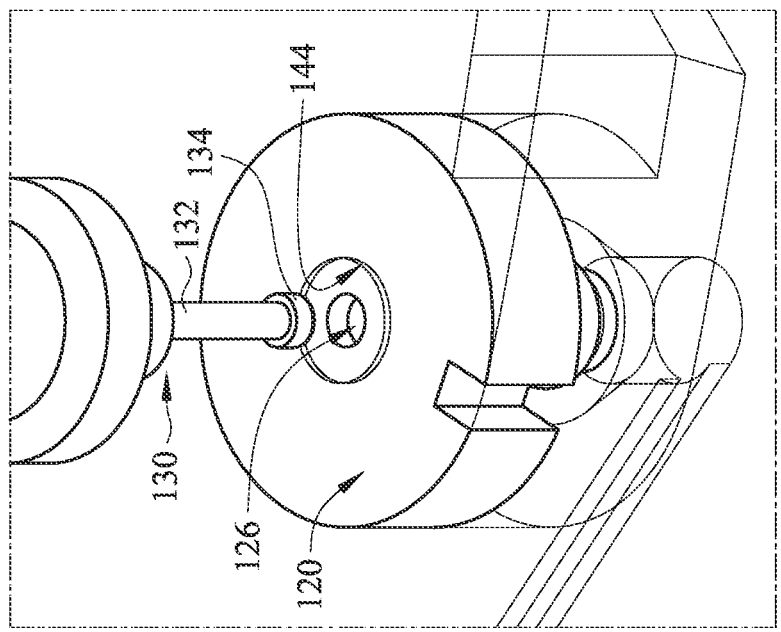
FIG. 11 is an action schematic view of the bolt and valve plug in a second position according to the present disclosure.

FIG. 9 is a schematic view of the valve plug of the present disclosure in the first position from another angle of view. FIG. 10 is an action schematic view of the bolt and valve plug of the present disclosure in the first position. FIG. 11 is an action schematic view of the bolt and valve plug of the present disclosure in a second position. Referring to FIGS. 1, 6 and 8 to 10 first, the present disclosure provides different inspection or mixing grooves according to process requirements, and can use the control unit 160 to provide program instructions to the centrifugal cassette driving element 154 in the driving module 150 to drive the centrifugal cassette 110 to rotate centrifugally, and the bolt driving element 152 drives the bolt 130 to move toward the corresponding valve plug 120. Thereafter, the bolt head 134 of the bolt 130 is passed through the thin film hole 144, and the bolt head 134 is inserted in the plug unplug hole 120. Furthermore, the bolt head 134 is allowed to be tightly combined with the valve plug 120 utilizing the soft material of the valve plug 120 and the fact that it is softer than the plug head 134 as mentioned above.

Figure 12:
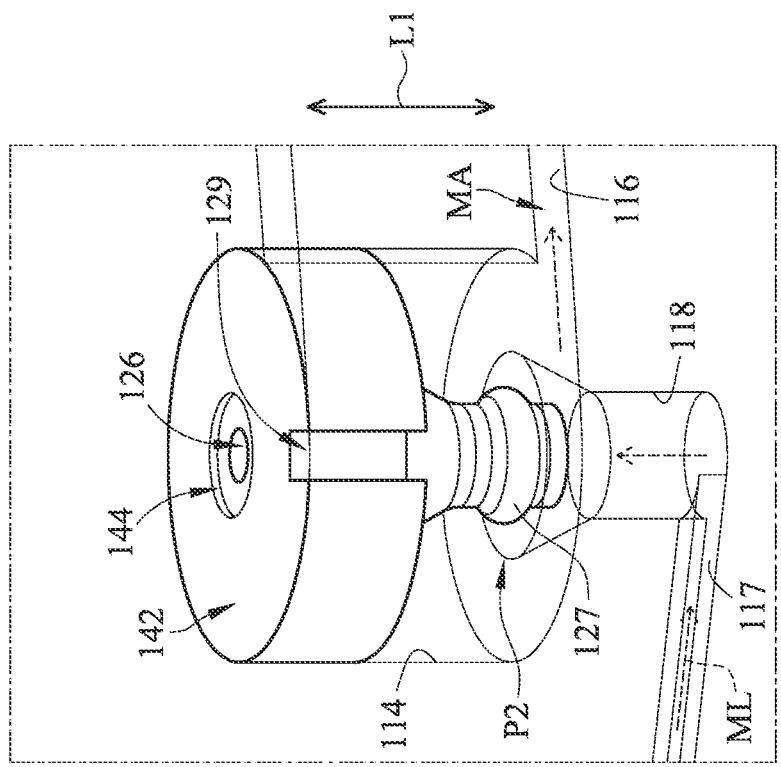
FIG. 12 is a schematic view of the valve plug in the second position from an angle of view.

Next, as FIGS. 11 and 12 show, the upward movement of the bolt 130 allows the valve plug 120 to be left from the communicating flow channel 118, making the flange 127 moved from the first position P1 to the second position P2. Since the flange 127 does not block the communicating flow channel 118, the flow of the fluid ML inside the flow channel MA is started, allowing the fluid ML to flow from the lower flow channel 117 to the upper flow channel 116.

In addition, since the bolt head 134 is smaller than the thin film hole 144 in diameter size, but the thin film hole 144 is smaller than the valve plug 120 in diameter, the bolt head 134 is allowed to be passed through the thin film hole 144, and the upward movement of the valve plug 120 to be limited while the bolt head 134 is moved upward continuously, so as to achieve the purpose of the bolt 130 being separated from the valve plug 120, and enable the repeated plug-and-unplug thereof.

In addition, the present disclosure can move the valve plug 120 to achieve the purpose of controlling the flow direction of the fluid, and to achieve the purpose of mixed fluid detection.

Conclusively, the fluid flow channel control system of the present disclosure controls the flow direction of the fluid effectively through the matching structure of the bolt and valve plug, and cooperates with centrifugal rotation to achieve the purpose of detection.

Furthermore, the present disclosure allows the bolt to be tightly combined with the valve plug through the different materials characteristics of the valve plug and bolt.

In addition, the present disclosure achieves the purpose of the separation of the bolt from the valve plug, and enables the repeated plug-and-unplug thereof by setting the size relationship of the thin film, bolt and valve plug.

Although the present disclosure has been disclosed as above in the form of embodiments, it is not intended to limit the present disclosure. Anyone with ordinary knowledge in the technical field may make some alternations and modifications without departing from the spirit and scope of the present disclosure, so the scope of protection of the present disclosure shall be subject to the scope of the claims attached.

What is claimed is:

1. A fluid flow channel control system, comprising:
  a centrifugal cassette, comprising a cassette body, at least one valve seat, at least one upper flow channel, at least one lower flow channel, and at least one communicating flow channel, wherein said at least one valve seat is provided on the surface of said cassette body, said at least one upper flow channel and said corresponding at least one lower flow channel are provided on different positions inside said cassette body, and communicated with each other through said corresponding at least one communicating cannel, allowing said at least one lower flow channel, said at least one communicating flow channel and said at least one upper flow channel to be formed into a flow channel, and said at least one valve seat is provided on said at least one communicating flow channel;
  at least one valve plug, movably accommodated on said at least one valve seat corresponding thereto, and comprising a plug-and-unplug hole and a flange;
  a bolt, comprising a bolt head;
  a drive module, comprising a bolt driving element in signal connection with said bolt; and
  a control unit, in signal connection with said drive module, and controlling said bolt driving element to drive said bolt, allowing said flange to be moved between a first position and a second position to close or open said flow channel while said bolt head is inserted in said plug-and-unplug hole.

2. The system according to claim 1, wherein said first position is a position that said flange is positioned within said at least one communicating flow channel, and said second position is a position that said flange is left from said at least communicating flow channel.

3. The system according to claim 1, wherein said drive module comprises a centrifugal cassette driving element in signal connection with said centrifugal cassette, and said control unit controls said centrifugal cassette driving element to drive said centrifugal cassette.

4. The system according to claim 1, further comprising: a thin film, comprising a thin film body, and a plurality of thin film holes passed through said thin film body covered on said cassette body, and the position of said thin film hole corresponding to the position of said at least one valve seat.

5. The system according to claim 4, wherein said plurality of thin film holes respectively are larger than said bolt head in diameter.

6. The system according to claim 5, wherein said plurality of thin film holes respectively are smaller than said corresponding at least one valve plug in diameter.

7. The system according to claim 1, wherein said at least one valve plug is made of a soft material.

8. The system according to claim 1, wherein said at least one valve plug is softer than said bolt.

9. The system according to claim 1, wherein said bolt head is larger than said plug-and-unplug hole in diameter.

10. The system according to claim 1, wherein said at least one valve plug further comprises a upper valve body and lower valve body connected to each other, said plug-and-unplug hole is passed through said upper valve body, and said flange is protruded out from the outer surface of said lower valve body.

11. The system according to claim 10, wherein said upper valve body is larger than said lower valve body in width.

12. The system according to claim 10, wherein said at least one valve plug further comprises an accommodating groove provided inside said upper valve body.

13. The system according to claim 12, wherein the width of said accommodating groove is larger than the diameter of said plug-and-unplug hole.

14. The system according to claim 10, wherein said at least one valve plug further comprises a cutting groove provided on said upper valve body.

15. The system according to claim 1, wherein said bolt comprises a rod body, said bolt head is in connection with the bottom of said rod body, and said rod body is smaller than said bolt head in diameter.

16. The system according to claim 1, wherein said at least one upper flow channel and at least one lower flow channel are respectively provided along a radial direction of said cassette body.

17. The system according to claim 1, wherein said at least one communicating flow channel is provided along an axial direction of said cassette body.

* * * * *